United States Patent
Ishida et al.

(10) Patent No.: US 9,586,852 B2
(45) Date of Patent: Mar. 7, 2017

(54) METHOD OF MANUFACTURING PREFORM FOR MULTICORE FIBER AND METHOD OF MANUFACTURING MULTICORE FIBER

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

(*) Notice: Subject to any disclaimer, the term of this patent is extended or adjusted under 35 U.S.C. 154(b) by 163 days.

(21) Appl. No.: 14/170,873

(22) Filed: Feb. 3, 2014

(65) Prior Publication Data

US 2014/0216109 A1 Aug. 7, 2014

(30) Foreign Application Priority Data

Feb. 5, 2013 (JP) ................... 2013-020052

(51) Int. Cl.
*C03B 37/028* (2006.01)
*G02B 6/02* (2006.01)
(Continued)

(52) U.S. Cl.
CPC .. *C03B 37/01222* (2013.01); *C03B 37/02754* (2013.01); *G02B 6/02042* (2013.01); *C03B 2203/34* (2013.01)

(58) Field of Classification Search
CPC . C03B 37/0279; C03B 37/027; C03B 37/028; C03B 37/0253; G02B 6/02042
See application file for complete search history.

(56) References Cited

U.S. PATENT DOCUMENTS 4,269,024 A * 5/1981 Ashpole ................. G02B 6/449
264/1.28
4,360,372 A * 11/1982 Maciejko .............. C03B 37/028
385/115
(Continued)

FOREIGN PATENT DOCUMENTS

JP 56-167109 A 12/1981
JP 2001-511538 A 8/2001
(Continued)

OTHER PUBLICATIONS

Office Action dated Dec. 16, 2014, issued in corresponding Japanese Application No. 2013-020052, with English Translation. (7 pages).

*Primary Examiner* — Jodi C Franklin
(74) *Attorney, Agent, or Firm* — Westerman, Hattori, Daniels & Adrian, LLP (57) ABSTRACT

A plurality of clad rods, and a clad tube, an arrangement process for arranging the plurality of core rods and the plurality of clad rods in a tube of the clad tube, in a state in which distances between center axes of the adjacent core rods become equal to each other and a state in which parts of outer circumferential surfaces in the adjacent rods contact, and an integration process for integrating the clad tube and the plurality of core rods and the plurality of clad rods arranged in the tube, wherein a ratio of a total cross-sectional area of a direction orthogonal to a length direction in the plurality of core rods and the plurality of clad rods with respect to an internal cross-sectional area of the tube of a direction orthogonal to a length direction in the clad tube is 0.84 or more.

7 Claims, 9 Drawing Sheets

(51) Int. Cl.
   *C03B 37/012*   (2006.01)
   *C03B 37/027*   (2006.01)

(56) References Cited

U.S. PATENT DOCUMENTS

| | | | | |
|---|---|---|---|---|
| 4,389,089 | A * | 6/1983 | Strack | C03B 37/028 385/116 |
| 5,048,923 | A * | 9/1991 | Tsumanuma | C03B 37/01214 385/117 |
| 5,268,983 | A * | 12/1993 | Tatarka | G02B 6/441 385/103 |
| 5,751,879 | A * | 5/1998 | Graham | G02B 6/441 174/107 |
| 5,825,957 | A * | 10/1998 | Song | G02B 6/4407 385/110 |
| 6,154,594 | A * | 11/2000 | Fiacco | C03B 37/01222 385/126 |
| 6,389,204 | B1 * | 5/2002 | Hurley | G02B 6/4432 385/102 |
| 6,775,444 | B1 * | 8/2004 | Hurley | G02B 6/449 385/104 |
| 6,937,801 | B2 * | 8/2005 | McAlpine | G02B 6/441 385/102 |
| 7,113,680 | B2 * | 9/2006 | Hurley | G02B 6/441 385/112 |
| 8,224,140 | B2 * | 7/2012 | Hurley | B29D 11/00663 385/102 |
| 8,488,929 | B2 * | 7/2013 | Hurley | G02B 6/4401 385/100 |
| 8,582,941 | B2 * | 11/2013 | Conrad | G02B 6/0365 385/110 |
| 8,660,393 | B2 * | 2/2014 | Hurley | B29D 11/00663 385/102 |
| 2003/0031434 | A1 * | 2/2003 | Fajardo | C03B 37/01205 385/115 |
| 2003/0202758 | A1 * | 10/2003 | Ardouin | G02B 6/449 385/111 |
| 2004/0017981 | A1 * | 1/2004 | Jovanovich | B01L 3/563 385/68 |
| 2004/0258375 | A1 * | 12/2004 | Honjo | G02B 6/4434 385/103 |
| 2005/0192480 | A1 * | 9/2005 | Toriya | A61B 1/00167 600/182 |
| 2006/0010920 | A1 * | 1/2006 | Cheo | C03B 37/01214 65/390 |
| 2008/0018989 | A1 * | 1/2008 | Tanigawa | G02B 6/02042 359/341.3 |
| 2011/0188820 | A1 * | 8/2011 | Merbach | G02B 6/4484 385/111 |
| 2011/0206331 | A1 * | 8/2011 | Imamura | C03B 37/01222 385/127 |
| 2012/0195563 | A1 * | 8/2012 | Takenaga | G02B 6/02042 385/126 |
| 2013/0306122 | A1 * | 11/2013 | McIntyre | H01L 35/32 136/205 |

FOREIGN PATENT DOCUMENTS

| | | |
|---|---|---|
| JP | 2003-201140 A | 7/2003 |
| JP | 2006-131427 A | 5/2006 |
| WO | 99/05550 A1 | 2/1999 |
| WO | 2005/090248 A1 | 9/2005 |
| WO | 2010/119930 A1 | 10/2010 |

* cited by examiner

METHOD OF MANUFACTURING PREFORM FOR MULTICORE FIBER AND METHOD OF MANUFACTURING MULTICORE FIBER

BACKGROUND OF THE INVENTION

The present invention relates to a method of manufacturing a preform for a multicore fiber and a method of manufacturing a multicore fiber that are suitable when a multicore fiber including a plurality of cores and a clad surrounding outer circumferences of the plurality of cores is manufactured.

As one of methods of manufacturing a multicore fiber, a stack-and-draw method is known. In the stack-and-draw method, a rod-like preform becoming a core (hereinafter, referred to as a core preform) is surrounded by a preform becoming a clad (hereinafter, referred to as a clad preform) and a gap of the core preform and the clad preform is buried, so that a preform for the multicore fiber is manufactured. In addition, the preform for the multicore fiber is drawn, so that the multicore fiber is manufactured.

As a method of manufacturing a multicore fiber using the stack-and-draw method, patent Literature 1 has been suggested.

In JP 2003-201140 A, clad preforms are arranged at center portions of four core preforms and clad preforms are arranged outside the core preforms. In portions where the core preforms contact in the clad preforms of the center portions and the outside clad preforms, a circular arc surface having almost the same curvature at outer circumferential circles of the core preforms is formed. In addition, in external surface portions in the outside clad preforms, a circular arc surface having almost the same curvature at a circle where the four core preforms contact at the same time is formed.

The four core preforms are gathered using the clad preforms of the center portions and the outside clad preforms, so that a preform for a multicore fiber is manufactured. The preform for the multicore fiber is drawn, so that a multicore fiber is manufactured.

Patent Literature 1: JP 2003-201140 A

SUMMARY OF THE INVENTION

In JP 2003-201140 A, it becomes essential to execute processing to form the circular arc surface having almost the same curvature at the outer circumferential circles of the core preforms for the plurality of clad preforms. However, it is difficult to form the circular arc surface.

Even when the circular arc surface having almost the same curvature at the outer circumferential circles of the core preforms can be formed in the plurality of clad preforms, a large variation is generated in a circular arc surface portion in each clad preform. In addition, accuracy of arrangement positions of the core preforms is lowered due to the variation and optical loss increases.

Accordingly, it is an object of the present invention to provide a method of manufacturing a preform for a multicore fiber and a method of manufacturing a multicore fiber that can decrease optical loss easily.

In order to resolve the above-described problems, according to an aspect of the present invention, there is provided a method of manufacturing a preform for a multicore fiber. The method includes a preparation process for preparing for a plurality of core rods, a plurality of clad rods, and a clad tube, an arrangement process for arranging the plurality of core rods and the plurality of clad rods in a tube of the clad tube, in a state in which distances between center axes of the adjacent core rods become equal to each other and a state in which parts of outer circumferential surfaces in the adjacent rods contact, and an integration process for integrating the clad tube and the plurality of core rods and the plurality of clad rods arranged in the tube. A ratio of a total cross-sectional area of a direction orthogonal to a length direction in the plurality of core rods and the plurality of clad rods with respect to an internal cross-sectional area of the tube of a direction orthogonal to a length direction in the clad tube is 0.84 or more.

In the case of this relation, a variation of the inter-core distances in the multicore fiber manufactured from the preform for the multicore fiber is decreased and optical loss can be decreased, as compared with the case in which the relation becomes less than 0.84. In addition, the optical loss of the multicore fiber can be decreased without executing special processing on the clad rod and the clad tube to be matched with the outer circumferential shape of the core rod. In this way, the method of manufacturing the preform for the multicore fiber that can decrease the optical loss easily is realized.

Preferably, the ratio is in a range from 0.84 to 0.96, inclusive.

In the case in which the ratio is more than 0.96, when the core rods and the clad rods are arranged in the clad tube, damages are easily generated on surfaces of the core rods and the clad rods. In addition, the multicore fiber manufactured from the preform for the multicore fiber having the damages includes bubbles in places corresponding to the damages. Therefore, the ratio becomes 0.96 or less, so that the damages are suppressed from being generated on the surfaces of the core rods and the clad rods and the optical loss can be prevented from being generated due to the bubbles obtained from the damages.

Preferably, at least the arrangement process and the integration process are executed are executed in a clean room where a particle number concentration becomes 10000 $m^{-3}$ or less.

In this case, the optical loss of the multicore fiber manufactured from the preform for the multicore fiber can be decreased to the same level as a loss level of a single core fiber. Therefore, the optical loss in the multicore fiber manufactured from the preform for the multicore fiber can be further decreased.

Preferably, in the preparation process, first clad rods having a diameter equal to a diameter of the core rods and second clad rods having a diameter smaller than the diameter of the first clad rods are prepared and in the arrangement process, the plurality of core rods and the first clad rods are arranged in a state in which a cross-sectional shape coupling centers of the three adjacent rods becomes a triangle and a state in which parts of the outer circumferential surfaces in at least the two core rods of the plurality of core rods contact an inner circumferential surface of the clad tube and the second clad rods are arranged in a state in which the second clad rods contact parts of the outer circumferential surfaces in the core rods contacting the inner circumferential surface of the clad tube, parts of the inner circumferential surface in the clad tube, and parts of the outer circumferential surfaces in the core rods sandwiched by the core rods contacting the inner circumferential surface of the clad tube.

In this case, even though a variation is generated in an outer diameter dimension of each core rod, an outer diameter dimension of the first clad rod, and an outer diameter dimension of the second clad rod, positions of the core rods can be suppressed from being deviated in a radial direction and a circumferential direction of the clad tube. Therefore, the optical loss in the multicore fiber manufactured from the preform for the multicore fiber can be further decreased.

Preferably, in the preparation process, second clad rods having a diameter smaller than a diameter of first clad rods having the same diameter as a diameter of the core rods are prepared and in the arrangement process, the plurality of core rods are arranged in a state in which a cross-sectional shape coupling centers of the three adjacent rods becomes a triangle and a state in which parts of the outer circumferential surfaces in at least the two core rods of the plurality of core rods contact an inner circumferential surface of the clad tube and the second clad rods are arranged in a state in which the second clad rods contact parts of the outer circumferential surfaces in the core rods contacting the inner circumferential surface of the clad tube, parts of the inner circumferential surface in the clad tube, and parts of the outer circumferential surfaces in the core rods sandwiched by the core rods contacting the inner circumferential surface of the clad tube.

In this case, even though a variation is generated in an outer diameter dimension of each core rod and an outer diameter dimension of the second clad rod, positions of the core rods can be suppressed from being deviated in a radial direction and a circumferential direction of the clad tube. Therefore, the optical loss in the multicore fiber manufactured from the preform for the multicore fiber can be further decreased.

Preferably, in the preparation process, third clad rods having a diameter smaller than the diameter of the second clad rods are further prepared and in the arrangement process, the third clad rods are arranged in gaps between the rods.

In this case, positions of the plurality of core rods and the first and second clad rods arranged in the tube of the clad tube can be further suppressed from being deviated.

According to another aspect of the present invention, there is provided a method of manufacturing a multicore fiber. The method includes a drawing process for drawing the preform for the multicore fiber manufactured by the method of manufacturing the preform for the multicore fiber.

In this method, as described above, the optical loss of the multicore fiber can be decreased without executing special processing on the clad rod and the clad tube to be matched with the outer circumferential shape of the core rod. In this way, the method of manufacturing the multicore fiber that can decrease the optical loss easily is realized.

According to another aspect of the present invention, there is provided a method of manufacturing a multicore fiber. The method includes a preparation process for preparing for a plurality of core rods, a plurality of clad rods, and a clad tube, an arrangement process for arranging the plurality of core rods and the plurality of clad rods in a tube of the clad tube, in a state in which distances between center axes of the adjacent core rods become equal to each other and a state in which parts of outer circumferential surfaces in the adjacent rods contact, and a drawing process for drawing the clad tube and the plurality of core rods and the plurality of clad rods arranged in the tube, while integrating the clad tube and the plurality of core rods and the plurality of clad rods. A ratio of a total cross-sectional area of a direction orthogonal to a length direction in the plurality of core rods and the plurality of clad rods with respect to an internal cross-sectional area of the tube of a direction orthogonal to a length direction in the clad tube is 0.84 or more.

As described above, the variation of the inter-core distances in the multicore fiber manufactured from the preform for the multicore fiber is decreased and the optical loss can be decreased, as compared with the case in which the relation becomes less than 0.84. In addition, the optical loss of the multicore fiber can be decreased without executing special processing on the clad rod and the clad tube to be matched with the outer circumferential shape of the core rod. In this way, the method of manufacturing the multicore fiber that can decrease the optical loss easily is realized.

As described above, according to the present invention, a method of manufacturing a preform for a multicore fiber and a method of manufacturing a multicore fiber that can decrease optical loss easily can be provided.

DETAILED DESCRIPTION OF THE INVENTION

Configuration of Multicore Fiber

Figure 1:
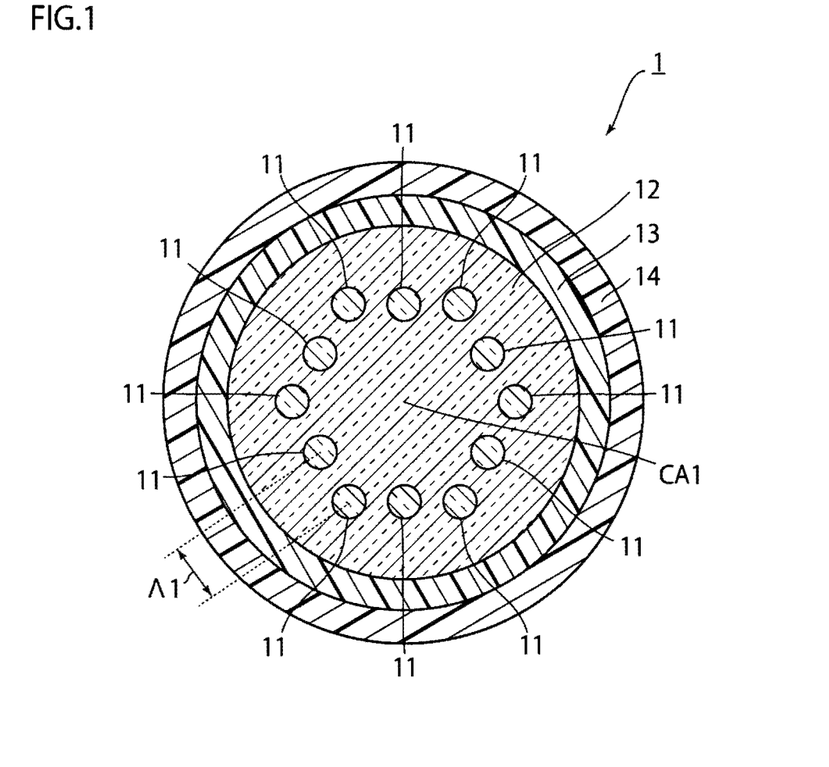
FIG. 1 is a diagram illustrating an aspect of a multicore fiber that is manufactured by a method of manufacturing a multicore fiber according to this embodiment.

FIG. 1 is a diagram illustrating an aspect of a multicore fiber 1 that is manufactured by a method of manufacturing a multicore fiber according to this embodiment. As illustrated in FIG. 1, the multicore fiber 1 according to this embodiment includes a plurality of cores 11, a clad 12 that surrounds outer circumferential surfaces of the plurality of cores 11 without a gap, a first protective layer 13 that covers the clad 12, and a second protective layer 14 that covers the first protective layer 13.

The plurality of cores 11 have the same configuration and inter-core distances between the adjacent cores (distances between center axes of the adjacent cores) Λ1 are equal to each other. In addition, a refractive index of each core 11 is higher than a refractive index of the clad 12.

In the case of this embodiment, the number of cores is 12 and the 12 cores 11 are arranged around a center axis CA1 of the clad 12. Distances from the 12 cores 11 to the center axis CA1 of the clad 12 are equal to each other.

That is, in a cross-section orthogonal to a length direction of the multicore fiber 1, centers of the 6 cores 11 and apexes of a regular hexagon based on the center of the clad 12 are matched with each other. The cores are arranged in intermediate portions between the adjacent cores in the 6 cores 11. The center axis CA1 of the clad 12 is also a center axis of the multicore fiber 1.

<Method of Manufacturing Multicore Fiber>

Figure 2:
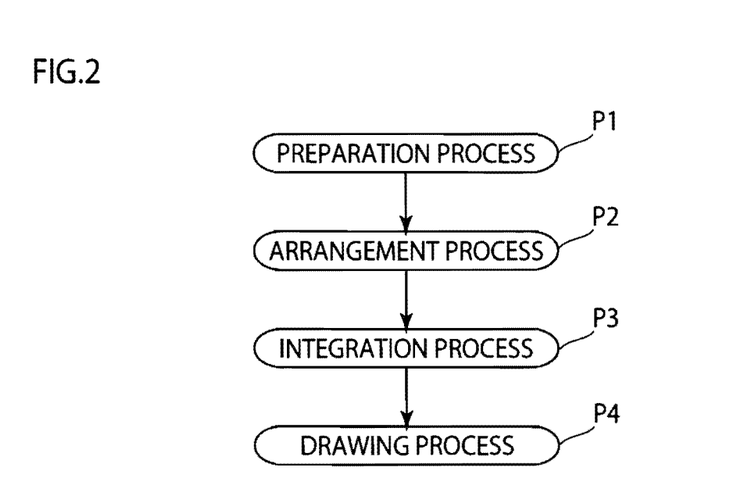
FIG. 2 is a flowchart illustrating the method of manufacturing a multicore fiber according to this embodiment.

FIG. 2 is a flowchart illustrating the method of manufacturing the multicore fiber 1 according to this embodiment. As illustrated in FIG. 2, the method of manufacturing the multicore fiber 1 according to this embodiment includes a preparation process P1, an arrangement process P2, an integration process P3, and a drawing process P4 as main processes.

At least the arrangement process P2 and the integration process P3 among these processes P1 to P4 are executed in a clean room where a particle number concentration becomes 10000 m$^{-3}$ or less.

<<Preparation Process>>

Figure 3:
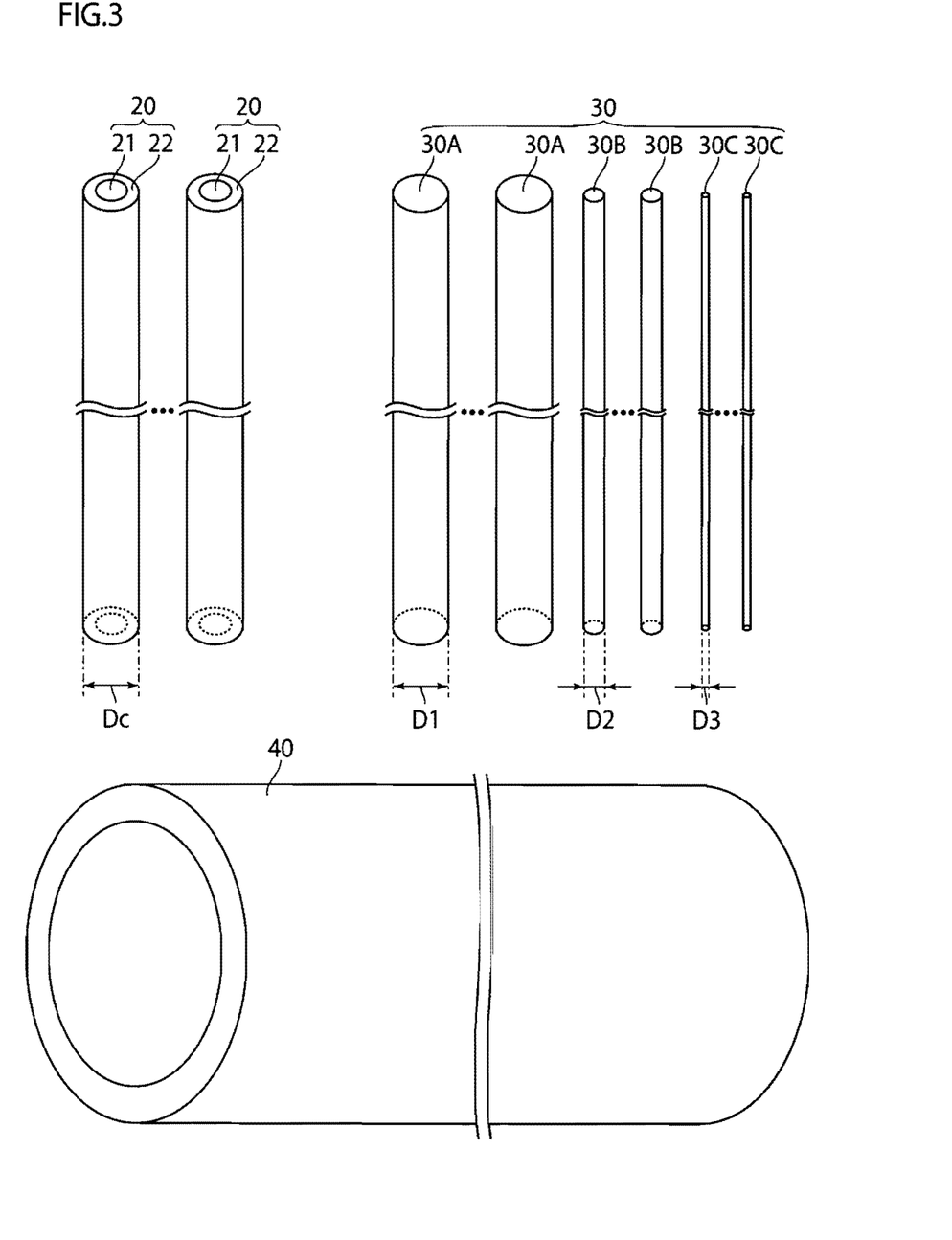
FIG. 3 is a diagram illustrating members to be prepared in a preparation process.

FIG. 3 is a diagram illustrating members to be prepared in the preparation process P1. As illustrated in FIG. 3, in the preparation process P1, a plurality of core rods 20, a plurality of clad rods 30 (30A to 30C), and a clad tube 40 are prepared as constituent members of a preform for the multicore fiber.

The core rod 20 is a cylindrical member inserted into a tube of the clad tube 40 and has a two-layered structure of a core element layer 21 and a clad element layer 22 covering an outer circumferential surface of the core element layer 21.

A refractive index of the core element layer 21 is higher than a refractive index of the clad element layer 22. Specifically, the case in which the core element layer 21 is formed of quartz to which germanium is added as a dopant and the clad element layer 22 is formed of pure quartz is exemplified.

The clad rod 30 is a cylindrical member inserted into the tube of the clad tube 40 and is formed of the same material as the clad element layer 22.

In the preparation process P1 according to this embodiment, a plurality of clad rods are prepared for each of the three kinds of clad rods 30A to 30C having different outer diameters. Specifically, the first clad rod 30A has a diameter D1 equal to a diameter Dc of the core rod 20, the second clad rod 30B has a diameter D2 smaller than the diameter D1 of the clad rod 30A, and the third clad rod 30C has a diameter D3 smaller than the diameter D2 of the clad rod 30B.

The clad tube 40 is a member of a circular tube shape becoming a component of an external portion of the preform for the multicore fiber and is formed of the same material as the clad element layer 22 and the clad rods 30 (30A to 30C).

The lengths of the core rod 20, the clad rod 30, and the clad tube 40 are equal to each other. A ratio of a total cross-sectional area of the core rods 20 and the clad rods 30 (30A to 30C) with respect to a cross-sectional area in the tube of the clad tube 40 is in a range from 0.84 to 0.96, inclusive.

The cross-sectional area in the tube of the clad tube 40 means an area of a region surrounded by an inner side of the clad tube 40, of a cross-section orthogonal to a length direction of the clad tube 40 and is represented as $\pi(D/2)^2$ when an inner diameter of the clad tube 40 is defined as D.

Meanwhile, the total cross-sectional area of the core rods 20 and the clad rods 30 means the sum total of a cross-sectional area orthogonal to a length direction of each core rod 20 inserted into the clad tube and a cross-sectional area orthogonal to a length direction of each clad rod 30 inserted into the clad tube.

<<Arrangement Process>>

In the arrangement process P2, surface processing such as cleaning and drying is executed as preprocessing for the plurality of core rods 20, the plurality of clad rods 30, and the clad tube 40 prepared in the preparation process P1. The surface processing may be executed in the preparation process P1.

Figure 4A:
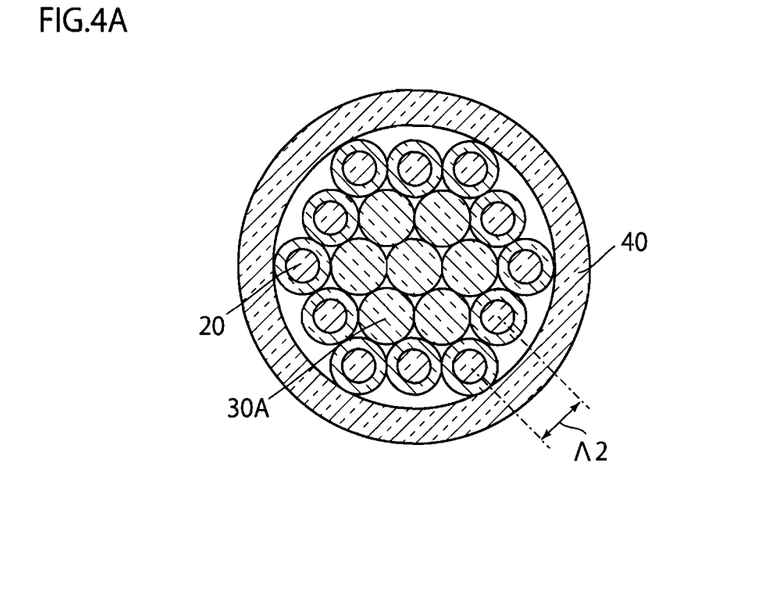
FIGS. 4A to 4C are diagrams illustrating an aspect of an arrangement process.
Figure 4B:
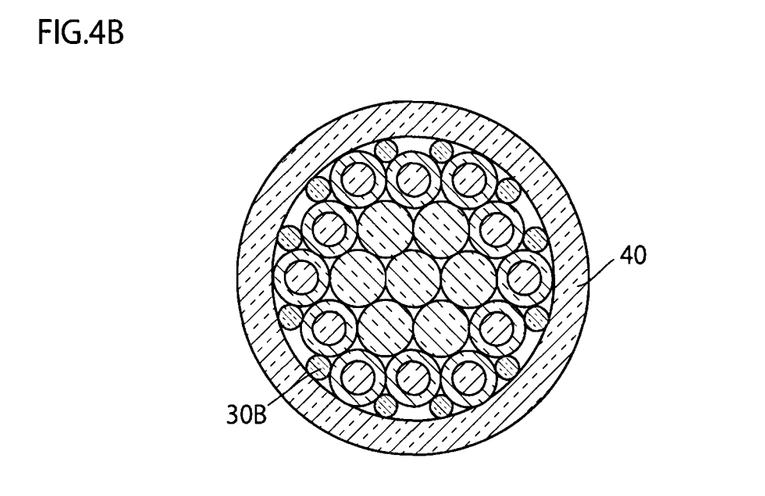
Figure 4C:
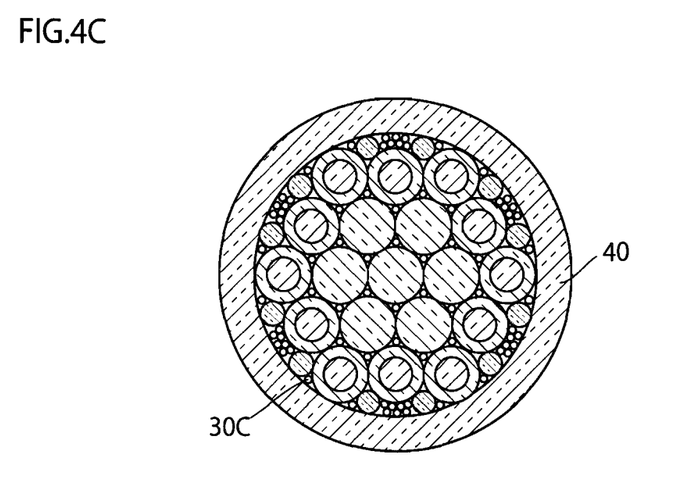

FIGS. 4A to 4C are diagrams illustrating an aspect of the arrangement process P2. As illustrated in FIGS. 4A to 4C, the plurality of core rods 20 and the plurality of clad rods 30 (30A to 30C) are arranged in the tube of the clad tube 40 in a state in which inter-core distances Λ2 between the adjacent core rods are equal to each other and a state in which parts of outer circumferential surfaces in the adjacent rods contact. The inter-core distances Λ2 mean distances between center axes of the adjacent core rods.

Specifically, as illustrated in FIG. 4A, first, the plurality of core rods 20 and the first clad rod 30A are arranged in a state in which a cross-sectional shape coupling centers of the three adjacent rods becomes a triangle and a state in which parts of the outer circumferential surfaces in the partial core rods 20 of the plurality of core rods 20 contact an inner circumferential surface of the clad tube 40.

By this arrangement, positions of the core rods 20 contacting the inner circumferential surface of the clad tube 40 are suppressed from being deviated in a radial direction of the clad tube 40.

In this embodiment, the case in which the number of cores is 12 is exemplified. However, when the number of cores is 6, the core rods 20 are arranged in a state in which the parts of all of the outer circumferential surfaces in the plurality of core rods 20 contact the inner circumferential surface of the clad tube 40. In addition, the clad rod 30A arranged at the center of the clad tube 40 may be changed to the core rod 20. That is, the core rods 20 may be arranged in a state in which the parts of the outer circumferential surfaces in at least the two core rods 20 among the plurality of core rods 20 contact the inner circumferential surface of the clad tube 40.

Next, as illustrated in FIG. 4B, the second clad rods 30B are arranged in a state in which the second clad rods 30B contact the parts of the outer circumferential surfaces in the core rods 20 contacting the inner circumferential surface of the clad tube 40, the parts of the inner circumferential surface in the clad tube 40, and the parts of the outer circumferential surfaces in the core rods 20 sandwiched by the core rods contacting the inner circumferential surface of the clad tube 40.

By this arrangement, the positions of the core rods 20 contacting the inner circumferential surface of the clad tube 40 are suppressed from being deviated in a circumferential direction of the clad tube 40. In addition, the positions of the core rods 20 sandwiched by the core rods contacting the inner circumferential surface of the clad tube 40 are suppressed from being deviated in the radial direction and the circumferential direction of the clad tube 40.

In this embodiment, the case in which the number of cores is 12 is exemplified. However, when the number of cores is 6, the core rods 20 sandwiched by the core rods contacting the inner circumferential surface of the clad tube 40 are changed to the clad rods 30A.

Next, as illustrated in FIG. 4C, the third clad rods 30C are arranged in gaps between the rods. By this arrangement, the positions of the plurality of core rods 20 and the clad rods 30A and 30B arranged in the tube of the clad tube 40 are suppressed from being deviated.

<<Integration Process>>

In the integration process P3, the clad tube 40 and the core rods 20 and the clad rods 30 (30A to 30C) inserted into the tube of the clad tube 40 are integrated with each other.

Specifically, the clad tube 40 and the core rods 20 and the clad rods 30 (30A to 30C) inserted into the tube of the clad tube 40 are heated in a vacuum state.

Figure 5:
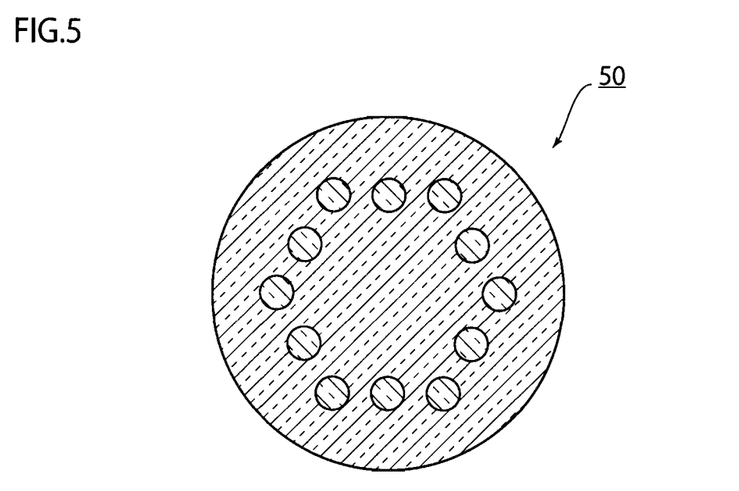
FIG. 5 is a diagram illustrating a cross-section of a length direction in a preform for a multicore fiber.

In this way, components adjacent to each other among the clad tube 40, the clad rods 30 (30A to 30C), and the clad element layers 22 of the core rods 20 are fused, the clad tube 40 is rarely deformed, and gaps in the tube are buried. As a result, the preform 50 for the multicore fiber illustrated in FIG. 5 is obtained.

<<Drawing Process>>

In the drawing process P4, terminal processing to form one end of the preform 50 for the multicore fiber obtained in the integration process P3 as a conical convex portion is executed as preprocessing. The terminal processing may be executed in the integration process P3.

In addition, the preform 50 for the multicore fiber is drawn from the side of one end on which the terminal processing has been executed. Specifically, the preform 50 for the multicore fiber is displaced in a spinning furnace and is heated in a vacuum state until the convex portion of the preform 50 for the multicore fiber is melt by the spinning furnace. In addition, the convex portion of the preform 50 for the multicore fiber in a molten state is drawn and the drawn portion is cooled down to an appropriate temperature by a cooling device.

As a result, the core element layer 21 in the core rod 20 in the drawn portion is formed as the core 11 and the clad element layer 22 of the core rod 20, the clad rod 30, and the clad tube 40 are formed as the clad 12.

Next, postprocessing to form the protective layers around the clad 12 is executed. That is, the outer circumferential surface of the clad 12 is coated with an ultraviolet curable resin for example, ultraviolet rays are irradiated onto the ultraviolet curable resin, and the first protective layer 13 is formed. Then, an outer circumferential surface of the first protective layer 13 is coated with an ultraviolet curable resin, ultraviolet rays are irradiated onto the ultraviolet curable resin, and the second protective layer 14 is formed. In this way, the multicore fiber 1 illustrated in FIG. 1 is manufactured.

<Effect>

As described above, in the preform 50 for the multicore fiber and the method of manufacturing the multicore fiber 1 in this embodiment, the core rods 20, the clad rods 30 (30A to 30C), and the clad tube 40 are prepared as the constituent members of the preform for the multicore fiber.

In addition, a ratio of a total cross-sectional area of the core rods 20 and the clad rods 30 (30A to 30C) with respect to the cross-sectional area in the tube of the clad tube 40 becomes 0.84 or more.

In the case of this relation, it has been known that the variation of the inter-core distances Λ1 in the multicore fiber 1 manufactured from the preform 50 for the multicore fiber is decreased and the optical loss can be decreased, as compared with the case in which the relation becomes less than 0.84. In addition, the optical loss can be decreased without executing special processing on the clad rod 30 and the clad tube 40 to be matched with the outer circumferential shape of the core rod 20. In this way, the method of manufacturing the preform 50 for the multicore fiber and the method of manufacturing the multicore fiber 1 that can decrease the optical loss easily are realized.

In the case of this embodiment, the ratio of the total cross-sectional area of the core rods 20 and the clad rods 30 (30A to 30C) with respect to the cross-sectional area in the tube of the clad tube 40 becomes 0.96 or less.

In the case in which the ratio is more than 0.96, when the core rods 20 and the clad rods 30 are arranged in the clad tube 40, damages are easily generated on surfaces of the core rods 20 and the clad rods 30. In addition, it has been known that the multicore fiber 1 manufactured from the preform 50 for the multicore fiber having the damages includes bubbles in places corresponding to the damages. Therefore, the ratio becomes 0.96 or less, so that the damages are suppressed from being generated on the surfaces of the core rods 20 and the clad rods 30 and the optical loss can be prevented from being generated due to the bubbles obtained from the damages.

In the case of this embodiment, the arrangement process P2 and the integration process P3 are executed in the clean room where the particle number concentration becomes 10000 $m^{-3}$ or less.

In this case, it has been known that the optical loss of the multicore fiber 1 manufactured from the preform 50 for the multicore fiber can be decreased to the same level as a loss level of a single core fiber. Therefore, the optical loss in the multicore fiber 1 manufactured from the preform 50 for the multicore fiber can be further decreased.

In the case of this embodiment, the plurality of core rods 20 and the first clad rod 30A are arranged in a state in which a cross-sectional shape coupling centers of the three adjacent rods becomes a triangle and a state in which the parts of the outer circumferential surfaces in the partial core rods 20 of the plurality of core rods 20 contact the inner circumferential surface of the clad tube 40.

In addition, the second clad rods 30B are arranged in a state in which the second clad rods 30B contact the parts of the outer circumferential surfaces in the core rods 20 contacting the inner circumferential surface of the clad tube 40, the parts of the inner circumferential surface in the clad tube 40, and the parts of the outer circumferential surfaces in the core rods 20 sandwiched by the core rods contacting the inner circumferential surface of the clad tube 40.

In this case, even though the variation is generated in an outer diameter dimension of the first clad rod 30A and an outer diameter dimension of the second clad rod 30B, the positions of the core rods 20 can be suppressed from being deviated in the radial direction and the circumferential direction of the clad tube 40. Therefore, the optical loss in the multicore fiber 1 manufactured from the preform 50 for the multicore fiber can be further decreased.

In the case of this embodiment, the third clad rods 30C are arranged in the gaps between the rods. In this case, the positions of the plurality of core rods 20 and the clad rods 30A and 30B arranged in the tube of the clad tube 40 can be further suppressed from being deviated.

Modifications

The embodiment has been described as one example. However, the present invention is not limited to the above embodiment.

For example, in the above embodiment, the arrangement form in which the individual rods are arranged around the center axis of the clad tube 40 such that the inter-core distances Λ2 of the 12 core rods 20 become equal to each other has been applied. However, arrangement forms other than the arrangement form according to the embodiment can be applied as arrangement aspects of the individual rods.

For example, an arrangement form in which the first clad rod 30A in the embodiment illustrated in FIG. 4C is changed to the core rod 20 can be applied. When this arrangement form is applied, in the preparation process P1, the preparation for the first clad rod 30A is omitted. Meanwhile, in the arrangement process P2, 19 core rods 20 are arranged in a state in which a cross-sectional shape coupling centers of the three adjacent rods becomes a triangle and a state in which parts of the outer circumferential surfaces in the 6 core rods 20 contact the inner circumferential surface of the clad tube 40. The second clad rods 30B and 30C are arranged in the same way as the case of the embodiment.

Figure 6:
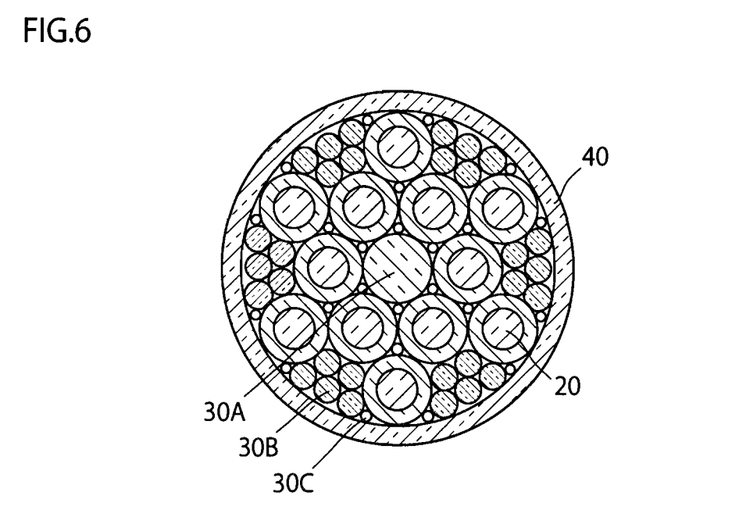
FIG. 6 is a diagram illustrating a rod arrangement form (1) different from a rod arrangement form according to the embodiment at the same point of sight as FIG. 4C.

In addition, an arrangement form illustrated in FIG. 6 can be applied. In the arrangement form illustrated in FIG. 6, the 6 core rods 20 are arranged around the center axis of the clad tube 40 and the 6 core rods 20 are arranged around the corresponding 6 core rods 20. The inter-core distances in the 12 core rods 20 are equal to each other. When this arrangement form is applied, in the arrangement process P2, the first clad rod 30A is arranged at the center of the clad tube 40 and the 12 core rods 20 are arranged in a state in which a cross-sectional shape coupling centers of the three adjacent rods becomes a triangle and a state in which parts of the outer circumferential surfaces in the 6 core rods 20 contact the inner circumferential surface of the clad tube 40. In addition, the second clad rods 30B are arranged in a state in which the second clad rod 30B contacts the parts of the outer circumferential surfaces in the core rods contacting the inner circumferential surface of the clad tube 40, the parts of the inner circumferential surfaces in the clad tube 40, and the parts of the outer circumferential surfaces in the core rods 20 sandwiched by the core rods contacting the inner circumferential surface of the clad tube 40, in units of the 5 second clad rods 30B. In FIG. 6, the 5 second clad rods 30B become each unit. However, the number of second clad rods 30B becoming each unit may be any one of various numbers equal to or more than 2. The third clad rods 30C are arranged in the same way as the case of the embodiment.

Figure 7:
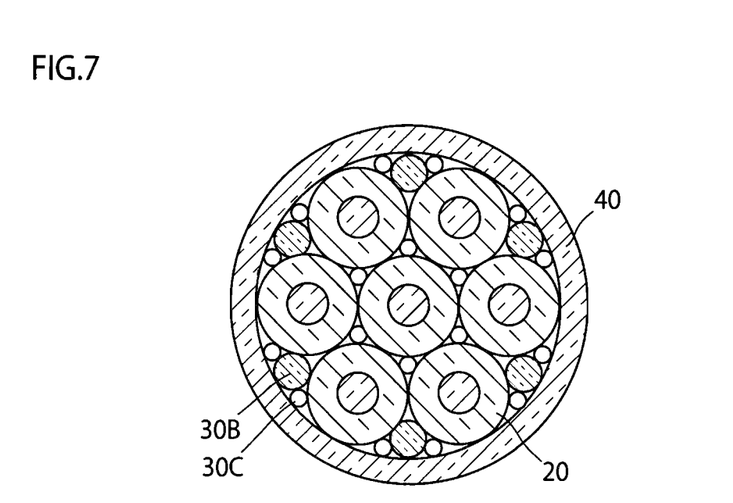
FIG. 7 is a diagram illustrating a rod arrangement form (2) different from the rod arrangement form according to the embodiment at the same point of sight as FIG. 4C.

In addition, an arrangement form illustrated in FIG. 7 can be applied. In the arrangement form illustrated in FIG. 7, one core rod 20 is arranged at the center of the clad tube 40 and 6 core rods 20 are arranged around the center axis. The inter-core distances in the 7 core rods 20 are equal to each other. When this arrangement form is applied, in the preparation process P1, the preparation for the first clad rod 30A is omitted. Meanwhile, in the arrangement process P2, 7 core rods 20 are arranged in a state in which a cross-sectional shape coupling centers of the three adjacent rods becomes a triangle and a state in which parts of the outer circumferential surfaces in the 6 core rods 20 contact the inner circumferential surface of the clad tube 40. In addition, the second clad rods 30B are arranged in a state in which the second clad rods contact the parts of the outer circumferential surfaces in the core rods 20 adjacent to each other among the core rods 20 contacting the inner circumferential surface of the clad tube 40 and the parts of the inner circumferential surface in the clad tube 40. The third clad rod 30C is arranged in the same way as the case of the embodiment.

The arrangement form of the rods in the embodiment illustrated in FIG. 4C and the arrangement forms of the rods illustrated in FIGS. 6 and 7 are only exemplary. In short, if the condition in which the ratio of the total cross-sectional area of the core rods 20 and the clad rods 30 (30A to 30C) with respect to the cross-sectional area in the tube of the clad tube 40 becomes 0.84 or more is satisfied, various arrangement forms other than the arrangement forms according to the embodiment and the modifications can be applied.

If the condition is satisfied, the number of each of the core rods 20 and the clad rods 30 can be set as any one of various numbers equal to or more than 2 and the shapes of the core rods 20 and the clad rods 30 can be set as various shapes other than the shape according to the embodiment and the shapes according to the modifications.

If the condition is satisfied, only one kind of clad rods 30A, 30B, or 30C may be used, a plurality of kinds of clad rods having different outer diameters may be used, and clad rods having outer diameters larger than the outer diameters of the core rods 20 may be used. If the condition is satisfied, the arrangement process P2 and the integration process P3 may be executed in a clean room where a particle number concentration is more than 10000 m$^{-3}$.

In the embodiment, the drawing process P4 is executed after the integration process P3 is executed. However, the integration process P3 and the drawing process P4 may be executed at the same time. When the integration process P3 and the drawing process P4 are executed at the same time, terminal processing to form one end of the clad tube 40 obtained by the arrangement process P2 and the core rods 20 and the clad rods 30 (30A to 30C) inserted into the tube of the clad tube 40 as a conical convex portion is executed. Then, the clad tube 40 is displaced in a spinning furnace and one end of the clad tube 40 and the core rods 20 and the clad rods 30 (30A to 30C) inserted into the tube of the clad tube 40 is drawn while being integrated, by the spinning furnace.

Even when the method of manufacturing the multicore fiber is applied, the optical loss can be easily decreased, similar to the method of manufacturing the multicore fiber in the embodiment.

In the method of manufacturing the preform 50 for the multicore fiber and the method of manufacturing the multicore fiber 1, combinations, omissions, changes, and additions of the known art can be appropriately made without departing from the object of the present invention, in addition to the content illustrated in the embodiment and the modifications.

Examples

Hereinafter, content of the present invention will be specifically described on the basis of Examples and Comparative examples. However, the present invention is not limited thereto.

A multicore fiber is manufactured by way of trial from each of 10 kinds of preforms for multicore fibers in which the clad tube 40, the core rods 20, and the clad rods 30 of the arrangement form illustrated in FIG. 4C are integrated, using the method of manufacturing the multicore fiber 1 in the embodiment. The multicore fibers are defined as Examples 1 to 8 and Comparative examples 1 and 2 and dimensions and characteristics of the multicore fibers are shown in the following Table 1.

TABLE 1

|  |  | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|---|
| Fiber length | km | 58 | 26 | 10 | 59 | 41 | 26 | 23 | 25 | 10 | 10 |
| Clad thickness | μm | 38.6 | 38.8 | 38.8 | 38.6 | 39.2 | 38.8 | 38.9 | 38.8 | 39.4 | 38.9 |
| Outer diameter of clad | μm | 225 | 225 | 225 | 225 | 225 | 225 | 225 | 225 | 225 | 225 |
| Outer diameter of multicore fiber | μm | 343 | 344 | 343 | 342 | 343 | 342 | 343 | 343 | 344 | 344 |
| Aeff at 1550 nm | μm$^2$ | 74 | 80 | 80 | 81 | 81 | 80 | 81 | 80 | 82 | 81 |
| Cutoff wavelength | μm | 1.42 | 1.46 | 1.46 | 1.47 | 1.45 | 1.46 | 1.47 | 1.46 | 1.45 | 1.45 |
| Filling rate | — | 0.88 | 0.88 | 0.88 | 0.88 | 0.88 | 0.87 | 0.86 | 0.84 | 0.83 | 0.81 |
| Inter-core distance | μm | 36.9 | 36.8 | 36.8 | 37.0 | 36.7 | 36.8 | 36.8 | 36.8 | 37.0 | 37.0 |
| Standard deviation of inter-core distances | μm | 0.37 | 0.21 | 0.18 | 0.28 | 0.25 | 0.50 | 0.69 | 1.21 | 1.64 | 1.97 |
| Connection loss | dB | 0.06 | 0.05 | 0.03 | 0.05 | 0.05 | 0.08 | 0.16 | 0.23 | 5.33 | 12.40 |
| Bubble in fiber |  | Absence | Absence | Absence | Absence | Absence | Absence | Absence | Absence | Absence | Absence |

A multicore fiber is manufactured by way of trial from each of 5 kinds of preforms for multicore fibers in which the clad tube 40, the core rods 20, and the clad rods 30 of the arrangement form illustrated in FIG. 6 are integrated, using the method of manufacturing the multicore fiber 1 in the embodiment. The multicore fibers are defined as Examples 9 to 13 and dimensions and characteristics of the multicore fibers are shown in the following Table 2.

TABLE 2

|  |  | Example 9 | Example 10 | Example 11 | Example 12 | Example 13 |
|---|---|---|---|---|---|---|
| Fiber length | km | 10 | 10 | 53 | 47 | 61 |
| Clad thickness | μm | 37.9 | 37.9 | 37.5 | 37.9 | 37.7 |
| Outer diameter of clad | μm | 230 | 230 | 230 | 230 | 230 |
| Outer diameter of multicore fiber | μm | 340 | 340 | 340 | 340 | 340 |
| Aeff at 1550 nm | μm$^2$ | 79 | 105 | 103 | 104 | 106 |
| Cutoff wavelength | μm | 1.42 | 1.4 | 1.39 | 1.37 | 1.39 |
| Filling rate | — | 0.90 | 0.90 | 0.91 | 0.90 | 0.90 |
| Inter-core distance | μm | 44.5 | 44.6 | 44.8 | 44.5 | 44.7 |
| Standard deviation of inter-core distances | μm | 0.25 | 0.19 | 0.17 | 0.21 | 0.19 |
| Connection loss | dB | 0.03 | 0.02 | 0.05 | 0.02 | 0.03 |
| Bubble in fiber |  | Absence | Absence | Absence | Absence | Absence |

A multicore fiber is manufactured by way of trial from each of 5 kinds of preforms for multicore fibers in which the clad tube 40, the core rods 20, and the clad rods 30 of the arrangement form illustrated in FIG. 7 are integrated, using the method of manufacturing the multicore fiber 1 in the embodiment. The multicore fibers are defined as Examples 14 to 16 and Comparative examples 3 and 4 and dimensions and characteristics of the multicore fibers are shown in the following Table 3.

TABLE 3

|  |  | Example 14 | Example 15 | Example 16 | Comparative Example 3 | Comparative Example 4 |
|---|---|---|---|---|---|---|
| Fiber length | km | 8 | 7 | 46 | 10 | 10 |
| Clad thickness | μm | 49.9 | 49.8 | 49.9 | 50.3 | 50.4 |
| Outer diameter of clad | μm | 195 | 195 | 195 | 195 | 195 |
| Outer diameter of multicore fiber | μm | 316 | 316 | 316 | 316 | 316 |
| Aeff at 1550 nm | μm$^2$ | 108 | 108 | 104 | 105 | 105 |
| Cutoff wavelength | μm | 1.41 | 1.41 | 1.49 | 1.51 | 1.53 |
| Filling rate | — | 0.93 | 0.95 | 0.96 | 0.97 | 0.98 |
| Inter-core distance | μm | 49.7 | 49.9 | 49.8 | 50.2 | 50.4 |
| Standard deviation of inter-core distances | μm | 0.21 | 0.18 | 0.19 | 0.16 | 0.15 |
| Connection loss | dB | 0.01 | 0.02 | 0.03 | 0.02 | 0.01 |
| Bubble in fiber |  | Absence | Absence | Absence | Presence | Presence |

The filling rate in Tables 1 to 3 means a ratio of the total cross-sectional area of the core rods 20 and the clad rods 30 with respect to the cross-sectional area in the tube of the clad tube 40. The standard deviation of the inter-core distances in Tables 1 to 3 is a standard deviation for inter-core distances between all adjacent cores in the multicore fibers manufactured by way of trial and the inter-core distance Λ1 is measured by an optical microscope.

The connection loss in Tables 1 to 3 is connection loss at a wavelength of 1550 nm. When the connection loss is defined as Ls, a deviation of a core position in the design and a core position at the time of trial manufacture is defined as d, and a mode field diameter of the core 11 is defined as 2ω, the connection loss is a value calculated using the following expression.

$$Ls = 10 \log(\exp(2d/2\omega)^2 \quad (1)$$

However, the mode field value 2ω in the expression (1) is set as a constant value to evaluate the connection loss due to the core arrangement.

In addition, the bubble in the fiber in Tables 1 to 3 is detected as follows. As a method for confirming whether the bubble included in the multicore fiber manufactured by way of trial is present or absent, first, an optical time domain reflectometer (OTDR) test is performed for all cores in the multicore fiber manufactured by way of trial and loss data in a fiber length direction is obtained. When an abnormal place is confirmed from the loss data and the abnormal place is present, an abnormal place portion is sampled and it is confirmed by a microscope whether the bubble included in the fiber is present or absent. When the bubble included in the fiber is present, the outer diameter of the core is greatly changed by the presence of the bubble and the loss is also changed. Therefore, the detection is enabled by using the OTDR test.

Figure 8:
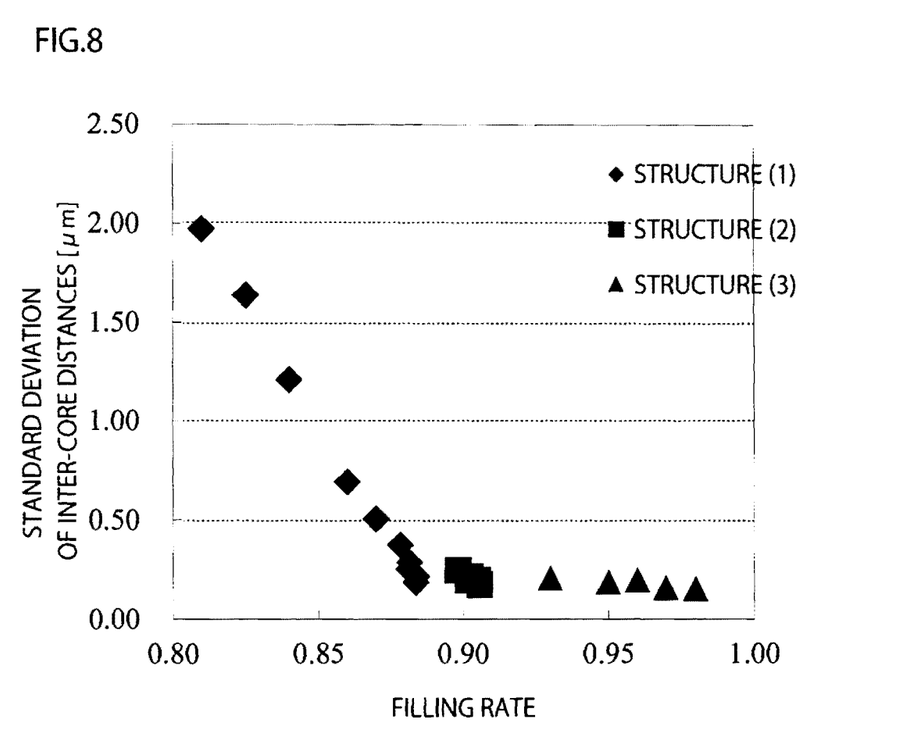
FIG. 8 is a graph illustrating a relation of an inter-core distance and a filling rate.
Figure 9:
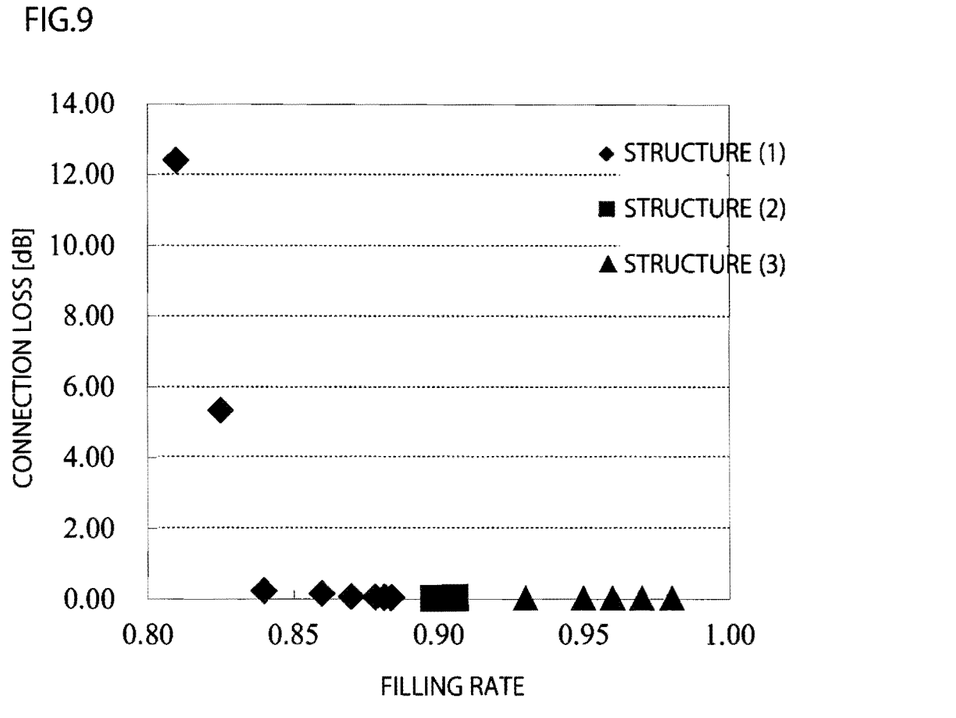
FIG. 9 is a graph illustrating a relation of connection loss and a filling rate.

Here, a relation of the standard deviation of the inter-core distances and the filling rate in Examples 1 to 16 and the Comparative examples 1 to 4 in Tables 1 to 3 is illustrated in FIG. 8. In addition, a relation of the connection loss and the filling rate in Examples 1 to 16 and the Comparative examples 1 to 4 in Tables 1 to 3 is illustrated in FIG. 9. In FIGS. 8 and 9, a "structure 1" corresponds to the multicore fiber of Table 1, a "structure 2" corresponds to the multicore fiber of Table 2, and a "structure 3" corresponds to the multicore fiber of Table 3.

As illustrated in FIG. 8, when the filling rate increases, the standard deviation of the inter-core distances decreases. From this, it has been known that a suppressing amount of the variation of the core positions in the multicore fiber increases when the filling rate increases.

Meanwhile, as illustrated in FIG. 9, when the filling rate increases, the connection loss decreases and when the filling rate becomes 0.84 or more, substantial connection loss is rarely generated. From this, it has been known that the connection loss of the multicore fiber can be decreased when the multicore fiber is manufactured from the preform for the multicore fiber of which the filling rate becomes 0.84 or more, using the method of manufacturing the multicore fiber 1 in the embodiment. In addition, it has been known that the connection loss of the multicore fiber manufactured from the preform for the multicore fiber can be decreased even when the arrangement forms of the rods in the preform for the multicore fiber are different.

As shown in Tables 1 to 3, the bubble included in the multicore fiber has been confirmed when the multicore fiber is manufactured from the preform for the multicore fiber of which the filling rate is more than 0.96. From this, when the multicore fiber is manufactured from the preform for the multicore fiber of which the filling rate becomes 0.96 or less, the bubble can be suppressed from being generated due to the damages generated on the surfaces of the core rods and the clad rods in the preform for the multicore fiber and the optical loss can be prevented from being generated. In FIG. 9, the reason why the connection loss of the multicore fiber manufactured from the preform for the multicore fiber of which the filling rate is more than 0.96 decreases is that the connection loss is calculated by the expression 1 on the assumption that there is no bubble in the multicore fiber.

Figure 10A:
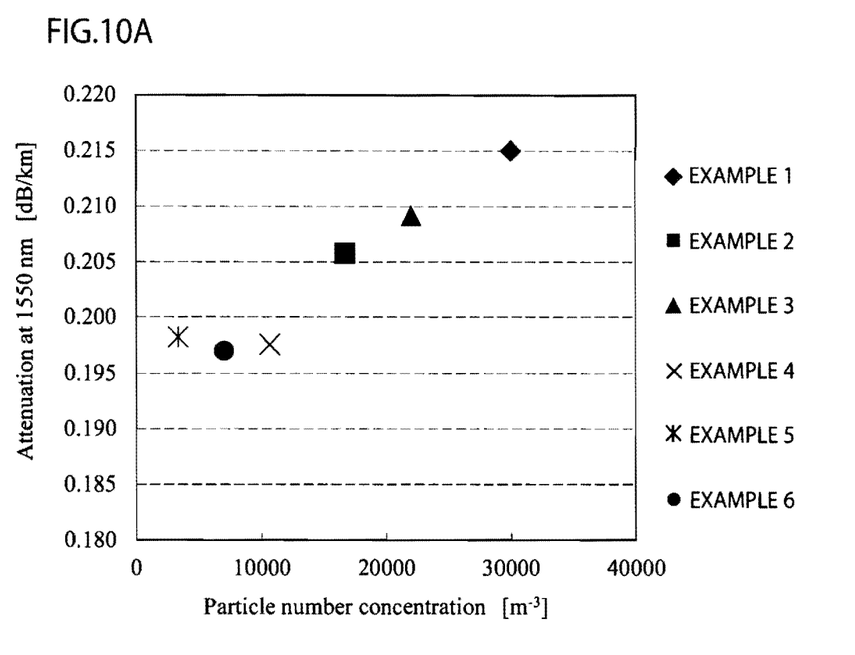
FIGS. 10A and 10B are graph illustrating a relation of optical loss and a particle number concentration.
Figure 10B:
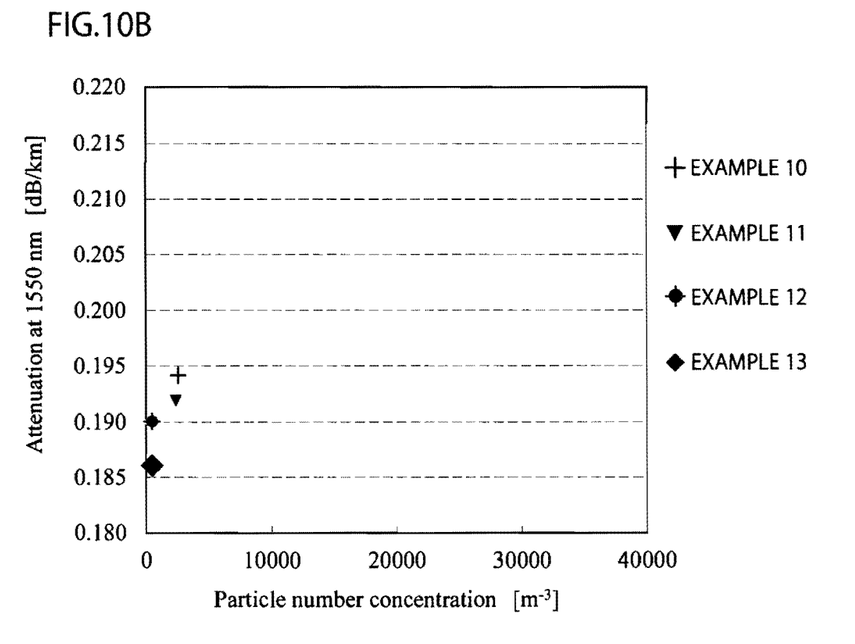

Next, a relation between the optical loss in the multicore fibers of Examples 1 to 6 and Examples 10 to 13 illustrated in the tables and the particle number concentration of the clean room in the arrangement process P2 and the integration process P3 when the multicore fiber is manufactured by way of trial is illustrated in FIGS. 10A and 10B. Specifically, FIG. 10A corresponds to Examples 1 to 6 illustrated in the tables and FIG. 10B corresponds to Examples 10 to 13 illustrated in the tables.

A plot illustrated in FIGS. 10A and 10B shows an average of the optical losses at the wavelength of 1550 nm measured for all of the cores in the multicore fiber. In addition, a particle number concentration illustrated in FIGS. 10A and 10B is measured for ambient particles of which a particle diameter is 0.5 μm or more, using a commercially available particle counter.

As illustrated in FIGS. 10A and 10B, it can be known that the optical loss increases when the particle number concentration increases. When a single core fiber is manufactured by way of trial from the core rods 20 used in Examples 1 to 6 and the optical loss in the single core fiber is measured, 0.196 dB/km is obtained. When a single core fiber is manufactured by way of trial from the core rods 20 used in Examples 10 to 13 and the optical loss in the single core fiber is measured, 0.188 dB/km is obtained.

Therefore, it has been known that the optical loss of the multicore fiber manufactured from the preform 50 for the multicore fiber can be decreased to the same level as a loss level of the single core fiber, when the arrangement process P2 and the integration process P3 are executed in the clean room where the particle number concentration becomes 10000 m$^{-3}$ or less and the method of manufacturing the multicore fiber in the embodiment is used.

The invention claimed is:

1. A method of manufacturing a preform for a multicore fiber, comprising:
    a preparation process of preparing for a plurality of core rods, a plurality of clad rods, and a clad tube, the respective core rods include a core element layer having a refractive index higher than the clad rods;
    an arrangement process of arranging the plurality of core rods and the plurality of clad rods in a tube of the clad tube, in a state in which distances between center axes of the adjacent core rods become equal to each other and a state in which parts of outer circumferential surfaces in the adjacent rods contact; and
    an integration process of integrating the clad tube and the plurality of core rods and the plurality of clad rods arranged in the tube,
    wherein, in the arrangement process, a ratio of a total cross-sectional area of a direction orthogonal to a length direction in the plurality of core rods and the plurality of clad rods with respect to an internal cross-sectional area of the tube of a direction orthogonal to a length direction in the clad tube is 0.84 or more, wherein the internal cross-sectional area of the tube is an area of a region surrounded by an inner circumference of cross-section of the tube, and the total cross-sectional area in the plurality of core rods and the plurality of clad rods is a sum of a cross-sectional area of all of the core rods arranged in the tube and a cross-sectional area of all of the clad rods arranged in the tube, wherein, in the preparation process, first clad rods having a diameter equal to a diameter of the core rods and second clad rods having a diameter smaller than the diameter of the first clad rods are prepared, and in the arrangement process, the plurality of core rods and the first clad rods are arranged in a state in which a cross-sectional shape coupling centers of the three adjacent rods becomes a triangle and a state in which parts of the outer circumferential surfaces in at least the two core rods of the plurality of core rods contact an inner circumferential surface of the clad tube and the second clad rods are arranged in a state in which the second clad rods contact parts of the outer circumferential surfaces in the core rods which are contacting the inner circumferential surface of the clad tube, parts of the inner circumferential surface in the clad tube, and parts of the outer circumferential surfaces of the core rods sandwiched by the core rods contacting the inner circumferential surface of the clad tube.

2. The method of manufacturing a preform for a multicore fiber according to claim 1,
wherein the ratio is in a range from 0.84 to 0.96, inclusive.

3. The method of manufacturing a preform for a multicore fiber according to claim 1,
wherein at least the arrangement process and the integration process are executed in a clean room where a particle number concentration becomes 10000 m$^{-3}$ or less.

4. The method of manufacturing a preform for a multicore fiber according to claim 1,
wherein, in the preparation process, third clad rods having a diameter smaller than the diameter of the second clad rods are further prepared and
in the arrangement process, the third clad rods are arranged in gaps between the rods.

5. A method of manufacturing a multicore fiber, comprising:
a drawing process for drawing the preform for the multicore fiber manufactured by the method according to claim 1.

6. The method of manufacturing a preform for a multicore fiber according to claim 1, the respective core rods include a core of the multicore fiber, and the respective first clad rods and the respective second clad rods do not include the core of the multi core fiber.

7. A method of manufacturing a multicore fiber, comprising:
a preparation process of preparing for a plurality of core rods, a plurality of clad rods, and a clad tube, the respective core rods include a core element layer having a refractive index higher than the clad rods;

an arrangement process of arranging the plurality of core rods and the plurality of clad rods in a tube of the clad tube, in a state in which distances between center axes of the adjacent core rods become equal to each other and a state in which parts of outer circumferential surfaces in the adjacent rods contact; and a drawing process of drawing the clad tube and the plurality of core rods and the plurality of clad rods arranged in the tube, while integrating the clad tube and the plurality of core rods and the plurality of clad rods, wherein, in the arrangement process, a ratio of a total cross-sectional area of a direction orthogonal to a length direction in the plurality of core rods and the plurality of clad rods with respect to an internal cross-sectional area of the tube of a direction orthogonal to a length direction in the clad tube is 0.84 or more, wherein the internal cross-sectional area of the tube is an area of a region surrounded by an inner circumference of cross-section of the tube, and the total cross-sectional area in the plurality of core rods and the plurality of clad rods is a sum of a cross-sectional area of all of the core rods arranged in the tube and a cross-sectional area of all of the clad rods arranged in the tube, wherein, in the preparation process, first clad rods having a diameter equal to a diameter of the core rods and second clad rods having a diameter smaller than the diameter of the first clad rods are prepared, and in the arrangement process, the plurality of core rods and the first clad rods are arranged in a state in which a cross-sectional shape coupling centers of the three adjacent rods becomes a triangle and a state in which parts of the outer circumferential surfaces in at least the two core rods of the plurality of core rods contact an inner circumferential surface of the clad tube and the second clad rods are arranged in a state in which the second clad rods contact parts of the outer circumferential surfaces in the core rods which are contacting the inner circumferential surface of the clad tube, parts of the inner circumferential surface in the clad tube, and parts of the outer circumferential surfaces of the core rods sandwiched by the core rods contacting the inner circumferential surface of the clad tube.

* * * * *